B. F. SHAFFER.
WHEEL BEARING.
APPLICATION FILED JUNE 5, 1918.

1,295,218.

Patented Feb. 25, 1919.

Inventor
Benjmine F. Shaffer

Witness

By
Attorney

UNITED STATES PATENT OFFICE.

BENJAMINE F. SHAFFER, OF CRYSTAL, MICHIGAN.

WHEEL-BEARING.

1,295,218.  Specification of Letters Patent.  Patented Feb. 25, 1919.

Application filed June 5, 1918. Serial No. 238,412.

*To all whom it may concern:*

Be it known that I, BENJAMINE F. SHAFFER, a citizen of the United States, residing at Crystal, in the county of Montcalm and State of Michigan, have invented certain new and useful Improvements in Wheel-Bearings, of which the following is a specification.

My invention relates to improvements in the steering wheel bearings on automobiles, and its objects are: first, to provide a means whereby the wear of the bearings may be readily taken up; second, to provide a means whereby the pivotal bolt may be firmly locked in place, and, third, to provide a means whereby the bearing and adjusting elements may be securely held from revolving with the wheel bearings.

Figure 1:
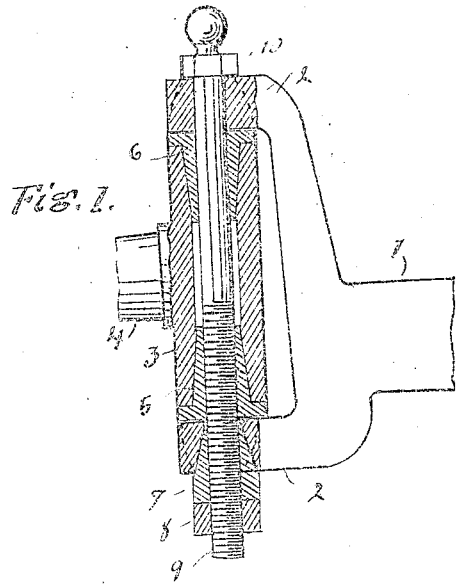
Figure 2:
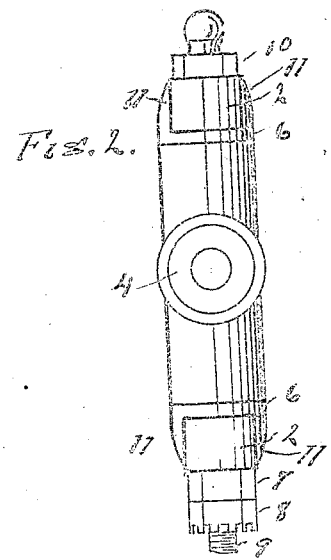

I attain these objects by the mechanism illustrated in the accompanying drawing, in which Figure 1 is a sectional elevation of the end of the yoke that carries the wheel bearing, and Fig. 2 is an end elevation of the wheel bearing.

Similar reference numerals indicate similar parts throughout the several views in the drawings.

My improvements are designed to be used upon the forks of any stock front axletree of an automobile, and are applied as follows:

I form two cones, 5 6, having wings 11 that extend up and down on each side of the ends 2 of the forks, thus rendering it impossible for the cones to revolve in the least degree. 4 represents the wheel bearing, and to make my invention more available I closely fit the cones into the ends of the swivel bar or support 3, as shown in Fig. 1. The cone 5 is screw threaded and the bolt 9 is also screw threaded from the lower end upward fully one half its length, so it may be screwed through the cone 5 and the cone may be drawn closely up into its bearing by operating the bolt through the medium of its head 10, in the usual manner of screwing a bolt into a nut or bearing.

To anchor the bolt firmly in position, and to lock it against the possibility of unscrewing from the cone 5, I form a conical bearing in the lower wing 2 for the reception of the conical nut 7, which may be very firmly screwed upon the bolt 9 without affecting the action of the support 3 upon the cones 5 and 6.

That the belt may be firmly and securely locked in place I apply a jam nut 8 by means of which the conical nut 7 may be securely anchored and all possibility of the parts becoming loose by reason of jarring is eliminated.

1 represents an ordinary axletree having the usual forks 2, the only work on the forks necessary to apply my improvement, being the forming of the bearing for the conical nut 7, and the bearings in the support 3 for the cones 5 and 6.

What I claim as new in the art is:

1. In combination with the front axletree and bearing forks of an automobile, cones fitted with wings arranged to form a recess in one end of each cone to firmly anchor them to the ends of the forks, and fitted to enter proper conical bearings in the wheel support, and means for adjusting the wear in the cone bearings.

2. In combination with a front axletree of an automobile, and its bearing forks, and the wheel bearings and support, cones formed into bearings in the wheel support, and to be anchored to the forks, a bolt passed through the forks, the cones and the support, said bolt screw-threaded through one of the cones, and a conical nut made to act in a conical bearing in one of the arms of the fork to secure the bolt and cones.

3. In combination with the front axletree of an automobile and its supporting forks, and with the wheel support, cones made to closely engage bearings in the support and having wings arranged to engage the forks at the ends, one of the cones screw threaded and the other plain, a bolt passing freely through one arm of the fork and through one of the cones, and screw threaded to engage the screw thread in the threaded cone, one arm of the fork having a conical opening through it in alinement with the bolt, a conical nut fitted to said conical opening and adapted to be screwed upon the bolt, and a jam nut for locking said conical nut into place, all so arranged that by unlocking the conical nut and screwing the bolt into the screw threaded cone said cone may be adjusted to desired positions.

Signed at Crystal, Michigan, May 27th, 1918.

BENJAMINE F. SHAFFER.